United States Patent
Godsey

(10) Patent No.: US 10,163,095 B2
(45) Date of Patent: Dec. 25, 2018

(54) SYSTEM AND METHODS FOR CONNECTIVITY CORRECTION

(71) Applicant: PayPal, Inc., San Jose, CA (US)

(72) Inventor: Sandra Lynn Godsey, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 1466 days.

(21) Appl. No.: 13/834,884

(22) Filed: Mar. 15, 2013

(65) Prior Publication Data

US 2014/0279125 A1     Sep. 18, 2014

(51) Int. Cl.
*G06Q 20/32*     (2012.01)

(52) U.S. Cl.
CPC .................. *G06Q 20/3255* (2013.01)

(58) Field of Classification Search
CPC ............ G06Q 30/0601; H04L 65/1096; H04L 65/1083; H04L 12/1428; H04L 65/80; H04L 12/14
See application file for complete search history.

(56) References Cited

U.S. PATENT DOCUMENTS

| | | | | |
|---|---|---|---|---|
| 7,409,451 | B1 * | 8/2008 | Meenan | H04L 12/5692 379/100.15 |
| 2006/0160543 | A1 * | 7/2006 | Mashinsky | H04W 16/10 455/452.2 |
| 2008/0095173 | A1 * | 4/2008 | Bugenhagen | H04L 1/0001 370/395.21 |
| 2009/0245792 | A1 * | 10/2009 | Oishi | H04Q 11/0067 398/66 |
| 2010/0106620 | A1 * | 4/2010 | Marcus | G06Q 20/10 705/26.1 |
| 2011/0035793 | A1 * | 2/2011 | Appelman | H04L 67/14 726/9 |
| 2011/0178897 | A1 * | 7/2011 | Balasubramanian | G06Q 20/12 705/27.1 |
| 2012/0124676 | A1 * | 5/2012 | Griffin | G06Q 20/12 726/28 |
| 2013/0235739 | A1 * | 9/2013 | Mamidwar | H04L 41/0816 370/252 |
| 2013/0278492 | A1 * | 10/2013 | Stolarz | G06F 3/01 345/156 |
| 2013/0290149 | A1 * | 10/2013 | Rashwan | G06Q 30/0641 705/27.1 |
| 2014/0222624 | A1 * | 8/2014 | Custer | G06Q 30/0637 705/26.82 |

* cited by examiner

*Primary Examiner* — Ranodhi Serrao
(74) *Attorney, Agent, or Firm* — Maschoff Brennan

(57) ABSTRACT

A system, computer-readable storage medium storing at least one program, and computer-implemented method for correcting an interruption to an electronic commerce session. The electronic commerce session of a user is monitored and a change in connectivity occurring during the electronic commerce session of a user is detected. The change in connectivity may introduce a delay to the electronic commerce session. In response to detecting the change in connectivity, an alternate communication mode to continue the electronic commerce session is selected. Completion of the electronic commerce session is facilitated using the selected alternate communication mode.

18 Claims, 11 Drawing Sheets

SYSTEM AND METHODS FOR CONNECTIVITY CORRECTION

TECHNICAL FIELD

Example embodiments of the present application generally relate to networked shopping and, more particularly in one embodiment, to a system and method for correcting an interruption to an electronic commerce session. The interruption may include a time-out in communicating information or an increased latency in exchange of messages between the service and the user device.

BACKGROUND

Currently, users of a networked marketplace may be able to shop, browse, compare, and share items offered for sale by a merchant. Users of some online marketplaces may be able to add items to an electronic shopping cart for purchase at a later time. Other network marketplaces allow users to bid on items offered for sale in an auction. Online marketplaces often provide users with the ability to "checkout" or purchase items added to a shopping cart or items for which the user has placed the winning bid.

A user who may experience a problem with network connectivity (e.g., low bandwidth connection or poor device performance) during their network session may be unable to complete their intended item browsing or item purchase. In such cases, a user may be forced to completely restart the session or complete their transaction at a later time.

BRIEF DESCRIPTION OF THE DRAWINGS

Some embodiments are illustrated by way of example and not limitation in the figures of the accompanying drawings in which.

DETAILED DESCRIPTION

Figure 1:
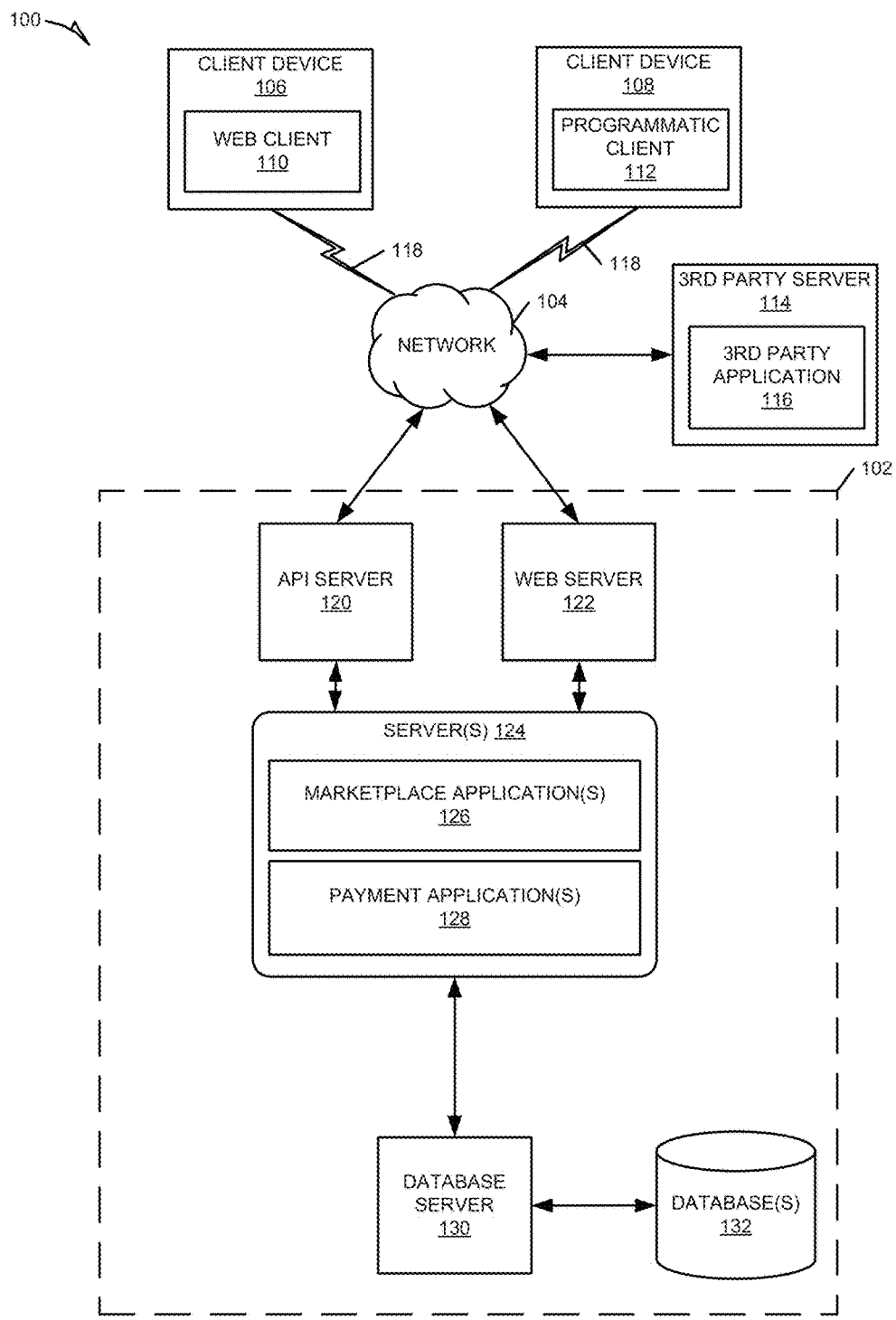
FIG. 1 is a network diagram depicting a network system having a client-server architecture configured for exchanging data over a network, according to an example embodiment.

Reference will now be made in detail to specific example embodiments for carrying out the inventive subject matter. Examples of these specific embodiments are illustrated in the accompanying drawings. It will be understood that it is not intended to limit the scope of the claims to the described embodiments. On the contrary, it is intended to cover alternatives, modifications, and equivalents as may be included within the spirit and scope of the disclosure as defined by the appended claims. In the following description, specific details are set forth in order to provide a thorough understanding of the subject matter. Embodiments may be practiced without some or all of these specific details. In addition, well known features may not have been described in detail to avoid unnecessarily obscuring the subject matter.

In accordance with the present disclosure, components, process steps, and/or data structures may be implemented using various types of operating systems, programming languages, computing platforms, computer programs, and/or general purpose machines. In addition, those of ordinary skill in the art will recognize that devices of a less general purpose or nature, such as hardwired devices, field programmable gate arrays (FPGAs), application specific integrated circuits (ASICs), or the like, may also be used without departing from the scope and spirit of the concepts disclosed herein. Embodiments may also be tangibly embodied as a set of computer instructions stored on a computer readable medium, such as a memory device.

Aspects of the present disclosure describe systems and methods for initiating alternative communications to overcome problems caused by a latency or interruption during an electronic commerce session. Consistent with some embodiments, the system may monitor a user's electronic commerce session to detect a change in connectivity. The change in connectivity may introduce a delay to the electronic commerce session. In some embodiments, the change in connectivity may cause a disruption to completing the electronic commerce session. In some embodiments, the interruption may be a poor connectivity event. Examples of a poor connectivity event include a low bandwidth connection, poor device performance, or excessive server load.

The user device may have a hierarchy of tasks that are disabled prior to transitioning communication modes. For example the device may disable a music or video player to free up resources and processing capabilities for the transaction. If such actions fail to improve the latency of the transaction then the device will transition to an alternate communication mode.

In some embodiments, an alternate communication mode is selected to continue the electronic commerce session based on the detecting of the change in connectivity in the electronic commerce session. The alternate communication mode may, for example, include text messaging (e.g., Short Message Service (SMS) message), instant messaging, telephonic communication, facsimile communication, or a low bandwidth, low resolution, or decreased functionality electronic commerce session application or browsing experience.

The system may facilitate completing the electronic commerce session using the alternate communication mode. For example, facilitating the completion of the electronic commerce session may include transforming information related to the state of the commerce session into a state that is compatible with the alternate communication mode. The transformed information may be used in generating and communicating a request to the user to continue the transaction via the alternate communication mode.

In some embodiments, an electronic commerce session may include a transaction for one or more items or services offered for sale by a merchant offering electronic payment options for users. Consistent with this embodiment, facilitating the completion of the commerce session may include facilitating payment of the one or more items or services.

FIG. 1 is a network diagram depicting an example network system 100, according to one embodiment, having a client-server architecture configured for exchanging data over a network. For example, the network system 100 may be a network-based marketplace 102 where clients may communicate and exchange data within the network system 100. The data may pertain to various functions and aspects associated with the network system 100 and its users.

A data exchange platform, in an example form of a network-based marketplace 102, may provide server-side functionality, via a network 104 (e.g., the Internet), to one or more client devices. The one or more client devices may be operated by users that use the network system 100 and, more specifically, the network-based marketplace 102, to exchange data over the network 104. These transactions may include transmitting, receiving (communicating), and processing data to, from, and regarding content and users of the network system 100. The data may include, but are not limited to, user data such as user preferences; product and service feedback, advice, and reviews; product, service, manufacturer, and vendor recommendations and identifiers; product and service listings associated with buyers and sellers; product and service advertisements; auction bids; and transaction data, among other things.

In various embodiments, the data exchanges within the network system 100 may be dependent upon user-selected functions available through one or more client or user interfaces (UIs). The UIs may be associated with a client device, such as a client device 106 using web client 110. The web client 110 may be in communication with the network-based marketplace 102 via a web server 122. The UIs may also be associated with a client device 108 using a programmatic client 112, such as a client application, or a third party server 114 (e.g., one or more servers or client devices) hosting a third party application 116. It can be appreciated that, in various embodiments, the client devices 106, 108, and/or the third party server 114 may be associated with a buyer, a seller, a third party electronic commerce platform, a payment service provider, or a shipping service provider, each in communication with the network-based marketplace 102 and optionally each other. The buyers and sellers may be any one of individuals, merchants, or service providers, among other things.

The client devices 106 and 108 may be any of a variety of types of devices (e.g., a cellular telephone, a smart phone, a personal digital assistant (PDA), a personal navigation device (PND), a handheld computer, a tablet computer, a desktop computer, a notebook computer, a wearable computing device, or other type of movable device). The client devices 106 and 108 may interface via a connection 118 with a communication network 104 (e.g., the Internet or Wide Area Network (WAN)). Depending on the form of the client device 106 and 108, any of a variety of types of connections 118 and communication networks 104 may be used.

For example, the connection 118 may be Code Division Multiple Access (CDMA) connection, a Global System for Mobile communications (GSM) connection, or other type of cellular connection. Such a connection 118 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the communication network 104 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or to other types of networks).

In another example, the connection 118 may be Wireless Fidelity (Wi-Fi, IEEE 802.11x type) connection, a Worldwide Interoperability for Microwave Access (WiMAX) connection, or another type of wireless data connection. In such an embodiment, the communication network 104 may include one or more wireless access points coupled to a local area network (LAN), a WAN, the Internet, or other packet-switched data network.

In yet another example, the connection 118 may be a wired connection, for example an Ethernet link, and the communication network 104 may be a LAN, a WAN, the Internet, or other packet-switched data network. Accordingly, a variety of different configurations are expressly contemplated.

FIG. 1 also illustrates a third party application 116 executing on a third party server 114 that may offer goods and services to users of the client devices 106 and 108. The third party application 116 may have programmatic access to the network-based marketplace 102 via the programmatic interface provided by the Application Program Interface (API) server 120. The third party application 116 may be associated with a vendor, a merchant, or any organizations that may conduct transactions with the users of the client devices 106 and 108. For some example embodiments, the third party application 116 may be associated with an online marketplace (e.g., eBay, Inc. of San Jose, Calif.).

Turning specifically to the networked-based marketplace 102, an API server 120 and a web server 122 are coupled to, and provide programmatic and web interfaces respectively to, one or more application servers 124. The application servers 124 host one or more marketplace application(s) 126, and payment application(s) 128. The application servers 124 may be coupled via these interfaces to the communication network 104, for example, via wired or wireless interfaces. The application servers 124 are, in turn, shown to be coupled to one or more database server(s) 130 that facilitate access to one or more database(s) 132. In some examples, the application servers 124 can access the database(s) 132 directly without the need for a database server 130.

The marketplace applications 126 may provide a number of marketplace functions and services to users that access the network-based marketplace 102. The payment applications 128 may likewise provide a number of payment services and functions to users. The payment applications 128 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 126. While the marketplace and payment applications 126 and 128 are shown in FIG. 1 to both form part of the network-based marketplace 102, it will be appreciated that, in alternative embodiments, the payment applications 128 may form part of a payment service that is separate and distinct from the network-based marketplace 102.

In some embodiments, the payment applications 128 may also extend credit to a user and/or may also have access to other funding sources to complete transactions. Examples of the funding sources include a credit card, a bank account, and/or a credit line. The payment applications 128 may operate as a money transmitter.

For some example embodiments, payment applications 128 generally enable transfer of values (e.g., funds, reward points, etc.) from an account associated with one party (referred to as a sender) to another account associated with another party (referred to as a receiver). To perform the value transfer, execution of the payment applications may be based on one or more approval flows. This may require having access or the rights to initiate these approval flows and to use the services of a payment facilitator. One example of a payment facilitator is the services offered by PayPal, Inc. of San Jose, Calif. Having access may not include having approval to transfer the values out of the sender's account, while having approval may implicitly include having access.

A third party associated with the third party application 116 may conduct transactions with a user and may receive information from the payment applications 128. The information may include information regarding an order for a product, a service, a gift, a donation, and so forth. The information may also include a shipment address specified by the user and payment status including payment confirmation. The payment applications 128 may secure financial information of the user with respect to the third party.

The client devices 106 or 108 may host the interface associated with the payment applications 128 of the application server(s) 124. The web client 110, and/or the programmatic client 112, may be associated with the marketplace applications 126 and/or the payment applications 128.

The payment applications 128 may have access to the database 132, which may be coupled to database server(s) 130. Database server 130 may facilitate access one or more databases 132 and retrieve data for inclusion in the network-based marketplace 102. The data may correspond to user data, user account information, transaction history, listings of products or related products offered for sale, feedback for products, and so forth. The user account information may include payment information, credit card information, checking account information, address information, phone numbers, user preferences and so forth. In some embodiments, the databases 132 may include databases both internal and external to the network-based marketplace 102.

Further, while the system 100 shown in FIG. 1 employs a client-server architecture, the present invention is, of course, not limited to such an architecture, and could equally well find application in an event-driven, distributed, or peer-to-peer architecture system, for example. The various modules of the application servers 124 may also be implemented as standalone systems or software programs, which do not necessarily have networking capabilities.

Figure 2:
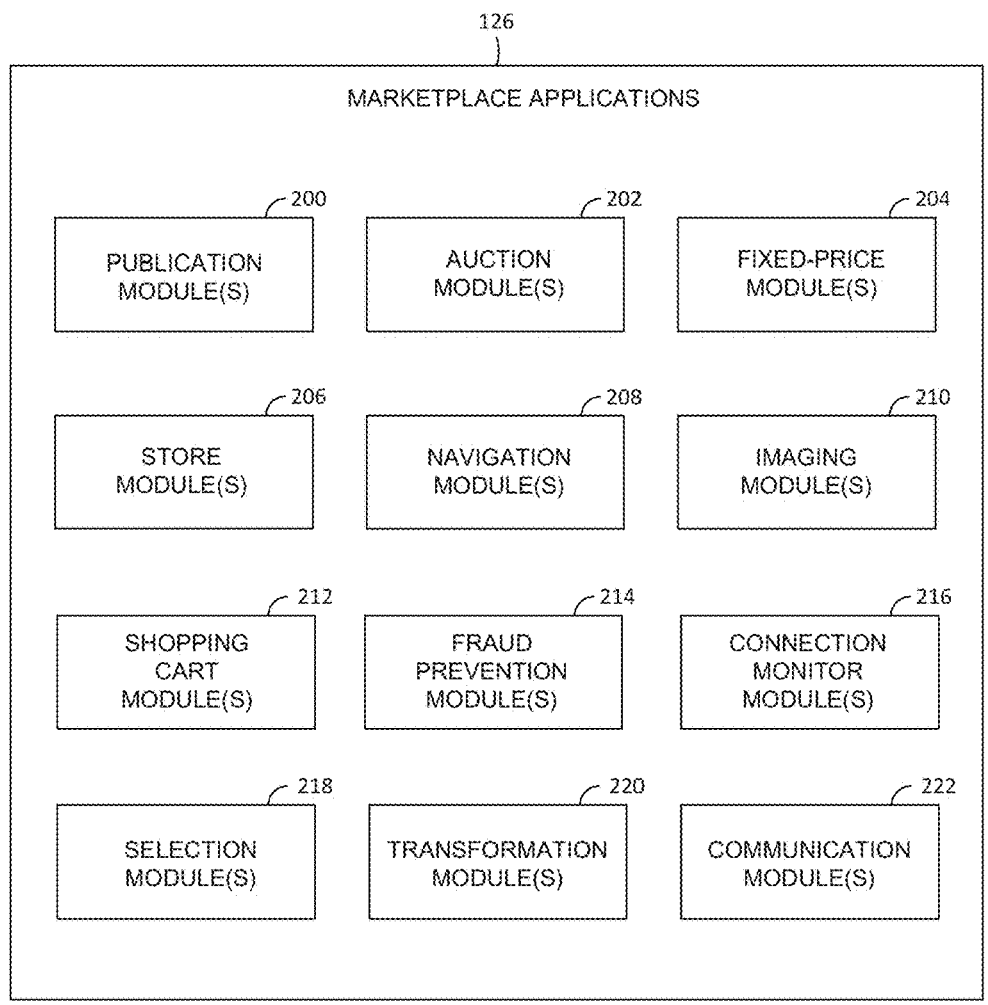
FIG. 2 is a block diagram illustrating an example embodiment of multiple modules forming a marketplace application, which are provided as part of the network-based marketplace.

FIG. 2 is a block diagram illustrating an example embodiment of multiple modules forming the marketplace applications 126, which are provided as part of the network-based marketplace 102. The modules of the marketplace applications 126 may be hosted on dedicated or shared server machines (not shown) that are communicatively coupled to enable communications between server machines. Each of the modules 200-222 are communicatively coupled (e.g., via appropriate interfaces) to each other and to various data sources, so as to allow information to be passed between the modules 200-222 of the marketplace applications 126 or so as to allow the modules 200-222 to share and access common data. The various modules of the marketplace applications 126 may furthermore access one or more databases 132 via the database servers 130.

The marketplace applications 126 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 126 are shown to include at least one publication module 200 and one or more auction modules 202, which support auction-format listing and price setting mechanisms (e.g., English, Dutch, Vickrey, Chinese, Double, Reverse auctions etc.). The various auction modules 202 may also provide a number of features in support of such auction-format listings, such as a reserve price feature whereby a seller may specify a reserve price in connection with a listing, and a proxy-bidding feature whereby a bidder may invoke automated proxy bidding.

A number of fixed-price modules 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store modules 206 may allow sellers to group their item listings (e.g., goods and/or services) within a "virtual" store, which may be branded and otherwise personalized by and for the sellers. Such a virtual store may also offer promotions, incentives, and features that are specific and personalized to a relevant seller. In one embodiment, the listings and/or transactions associated with the virtual store and its features may be provided to one or more users.

Navigation of the network-based marketplace 102 may be facilitated by one or more navigation modules 208. For example, a search module may, inter alia, enable key word searches of listings published via the marketplace 102. A browser module may allow users via an associated UI to browse various category, catalogue, inventory, social network, and review data structures within the marketplace 102. Various other navigation modules (e.g., an external search engine) may be provided to supplement the search and browsing modules.

In order to make listings, available via the network-based marketplace 102, as visually informing and attractive as possible, the marketplace modules 126 may include one or more imaging modules 210, which users may utilize to upload images for inclusion within listings. An imaging module 210 also operates to incorporate images within viewed listings. The imaging modules 210 may also support one or more promotional features, such as image galleries that are presented to potential buyers. For example, sellers may pay an additional fee to have an image included within a gallery of images for promoted items.

In some embodiments, electronic shopping cart modules 212 are used to create an electronic shopping cart used by users of the network-based marketplace 102 to add and store items listed by the store module(s) 206. The electronic shopping cart modules may also be used to "check out," meaning a user may purchase items in the electronic shopping cart. The electronic shopping cart modules 212 may facilitate the transactions by automatically finding the items in the electronic shopping cart across at least one or all of a predefined set of vendors, a comparison shopping site, an auction site, and so forth. In various embodiments, the selection criteria for which vendor or vendors to purchase from may include, but is not limited to, criteria such as lowest cost, fastest shipping time, preferred or highest rated vendors or sellers, or any combination thereof.

A number of fraud prevention modules 214 implement fraud detection and prevention mechanisms to reduce the occurrence of fraud within the network-based marketplace 102.

As illustrated in FIG. 2, the marketplace applications 126 may include one or more connection monitor modules 216, which may monitor a connection (e.g., connection 118) of a client device (e.g., client device 106) during an electronic commerce session. Consistent with some embodiments, an electronic commerce session may include utilization of the features of the network-based marketplace 102 during a network session of a client device with the network-based marketplace 102. For example, an electronic commerce session may include navigation of the network-based marketplace 102 facilitated by navigation modules 208. In another example, an electronic commerce session may include functions of the electronic shopping cart modules 212, such as adding one or more items to an electronic shopping cart. In yet another example, an electronic commerce session may include a transaction or payment for one or more goods or services facilitated by the payment applications 128. Each of the functions of the network-based marketplace 102 may represent one of a plurality of states of the electronic commerce session.

Connection monitor modules 224 may monitor the commerce session and detect a change in connectivity in the connection of the client device 106 to the communication network 104. The change in connectivity may introduce a delay to the commerce session. In some embodiments, the change in connectivity may be a poor connectivity event. By way of non-limiting example, a poor connectivity event may include a low-bandwidth connection, an overloaded server hosting the commerce session (e.g., application server 124), a high latency response from the client device, a weak or no signal for data transfer on a client device, or a malfunctioning or otherwise poorly performing client device (e.g., client device 106).

In some embodiments, the commerce session may include a physical location shopping experience in which the merchant provides payment services to the mobile devices of in-store customers. Such mobile payment services may provide payment services similar to those described above in reference to the payment applications 128. Consistent with these embodiments, the change in connectivity may be caused by a weakened signal or connection between the client device and the in-store communication network (e.g., WiFi hotspot). In some embodiments, the weakened connection may be caused by a user exiting the merchant's location.

In some embodiments, detecting a poor connectivity event may include measuring the latency of the connection 118 of client device 106 to the communication network 104 and/or web server 122. The latency of the connection refers to the time delay observed as data transmits from one networked device to another (e.g., from client device 106 to web server 122). Consistent with some embodiments, the latency of the connection may be a one-way measurement of the time a packet of data is transmitted from a source device (e.g., client device 106) until the data packed is received by the destination device (e.g., web server 122). In other embodiments, the latency of the connection may be a round-trip measurement of the time a packet of data is transmitted from a source to device (e.g., client device 106) to a destination device (e.g., web server 122) and back to the source device.

The connection monitor modules 216 may detect a poor connectivity event based on the latency of the connection 118 exceeding a predefined latency threshold. In some embodiments, the predefined latency threshold may be a default value or a value set by the administrator of the networked marketplace 102.

In some embodiments, detecting the change in connectivity may include measuring the load on the API server 120, web server 122, or application server 124. The "load" refers to the amount of computational work that each of these servers 120-124 is performing, respectively. The change in connectivity may be detected if the load on one of these servers exceeds a predefined threshold. The predefined threshold may be the maximum amount of computational work that each server 120-124 is capable of performing.

In some embodiments, the connection monitor modules 216 may monitor the state of the commerce session up to the point where the change in connectivity is detected. The connection monitor modules 216 may store the state of the commerce session prior to the detection of the change in connectivity in database 132. The storing of the state information may also include storing information associated the state of the commerce session. For example, the monitoring module may detect a poor connectivity event occurring during the checkout of items added to an electronic shopping cart. In this example, the monitor modules 216 may store the state (e.g., item checkout) of the transaction, including information related to the items being purchased, and any shipping or billing information received by the payment applications 128 during the disrupted transaction.

As illustrated in FIG. 2, the marketplace applications 126 may include one or more selection modules 218, which may select an alternate communication mode in response to the connection monitor modules 216 detecting the change in connectivity. The alternate communication mode may provide an alternative delivery network or platform to deliver messages and facilitate the completion the disrupted electronic commerce session. By way of non-limiting example, an alternate communication mode may be a text-based messaging system, a multimedia messaging service (MMS), a telephonic communication network, a facsimile communication network, a push notification service, or a reduced functionality networked marketplace service. A text-based messaging system may, for example, include SMS text messaging, instant message (IM), electronic mail (e-mail), iMessage, or the like. A reduced functionality networked marketplace service may be low bandwidth or reduced functionality version of any one of the features described herein in reference to the network-based marketplace 102. For example, a reduced functionality networked marketplace may provide a user the ability to navigate listings for only items with low resolution images. In another example embodiment, the reduced functionality networked marketplace may allow users to navigate through a collection of non-graphic, text-based item listings.

In some embodiments, the selection modules 218 may select an alternate communication mode based on user preferences stored in the profile of the user. For example, a user may specify a preference for receiving SMS messages to continue a commerce session in the event a session is interrupted. In some embodiments, the selection modules 218 may select an alternate communication mode based on a default setting configured by the system administrator. Alternate embodiments employ controls from the service provider that communicate with the user device through various means. For example, where the service provider is a cloud-based service, at least one control module in the cloud network may detect latency in communications with the user device and instruct the user device to switch to an alternate communication means. The control module may initiate a transfer to the alternate communication means with or without negotiation with the user device.

In other embodiments, the selection modules 218 may select an alternate communication mode based on the physical location of the user. For example, if a user has initiated payment for an in-store item via a mobile payment service offered by the in-store merchant and subsequently experiences a disruption to the transaction, the selection modules 218 may select a telephonic communication to complete the transaction so as to expedite the completion of the transaction prior to the user leaving the merchant's physical retail location. The selection modules 218 may transfer the transaction from the user device to a point of sale device to complete the transaction. In some instances, the user's location may be determined through the use of a global positioning system (GPS) module located on, for example, the user device. This location may be transmitted to the selection modules 218 during the user's ecommerce session.

In some embodiments, the location of the user may dictate the capabilities or limitations of the connection of the client device of the user with the communication network. Consistent with this embodiment, the selection modules 218 may select an alternate communication mode that is conducive to the capabilities of the user. For example, a user may be located in a region where bandwidth for cellular data transfers services (e.g., 3G or 4G network service) is very low or not available. In this example, the selection modules 218 may select an alternate communication mode such as a text-based messaging system that does not necessitate such a large amount of bandwidth for data transfer.

The transfer from one communication means to another may involve a selection by the user, a control mechanism in the user device, an application configured on the user device, a service provider application running on a server or in a cloud network configuration, or as initiated by the service provider. Many user devices are capable of a variety of communication means including, but not limited to, over the air protocols, hybrid cellular protocols, wifi, text message services, short messaging services, chat functions, and so forth, in addition to voice communications. These have a variety of operating characteristics and requirements for operation. The more information that is required for a communication means the more dependent the communication is on the connectivity between the user device and the service provider. To provide a full web-based application over the air requires good connectivity and strong signal at the user device, else the application will have a high latency and may time-out during communications. To provide text or simple messaging requires a more basic connectivity as such information does not include the graphic display information required for web and application based communications. Similarly, a voice communication requires only basic connectivity and signal strength.

As illustrated in FIG. 2, the marketplace applications 126 may include one or more transformation modules 220, which may retrieve the state of the electronic commerce session and related information from database 132 and transform the information into a format that is compatible with the alternate communication mode selected by selection modules 218. The state of the electronic commerce session may reference one of the various stages associated with the electronic commerce session occurring prior to the detection of the change in connectivity. The various stages of the session may include simply viewing a particular item, adding the item to an electronic shopping cart, or checking out (e.g., verification of shipping and billing information, confirmation of order, etc.). The information related to the state of the electronic commerce session may, for example, include information related to items viewed, items added to an electronic shopping cart, items for which the checkout process was initiated, shipping information, and billing information.

The transformation modules 220 may transform the electronic commerce session state information into a format containing only that information which is essential to continue the electronic commerce session. To this end, the transformation modules 220 may strip away certain pieces of information associated with the state of the session in order to render the information in a format suitable for the alternate communication mode. For example, a user may experience a change in connectivity after initiating checkout for an item added to an electronic shopping cart, but before his payment information has been entered and authorized. In this example, the transformation modules 220 may remove all graphic items that may normally be included during the checkout process (e.g., photos of the item, merchant banners or advertisements, etc.) as well as any text (e.g., item description, item condition, etc.) that is not essential to completing the checkout and payment of the item so as to render the information in a format suitable for transmission as an SMS message.

As illustrated in FIG. 2, the marketplace applications 126 may include one or more communication modules 222, which may facilitate the completion of an electronic commerce session. The communication modules 222 may facilitate the completion of the electronic commerce session utilizing the alternate communication mode selected by the selection modules 218.

In some embodiments, the communication modules 222 may facilitate a user completing an interrupted electronic commerce session through the generation and delivery of messages including the transformed commerce session information discussed above. The communication modules 222 may work in conjunction with the transformation modules 220 to generate messages in a format that is compatible with the alternate communication mode. In some embodiments, the generation of a message to facilitate the completion of the electronic commerce session may include retrieving certain information (e.g., a user telephone number, billing information, or shipping information) stored in a profile corresponding to the user. The user profile and accompanying information may be stored in database 132.

Depending on the alternate communication mode selected by the selection modules 218, respective communication modules 222 may utilize any one of a number of message delivery networks and platforms to deliver messages to users. For example, depending on the alternate communication mode selected by the selection modules 218, the communication modules 222 may deliver e-mail, IM, SMS, text, facsimile, or voice (e.g., Voice over IP (VoIP)) messages via the wired network (e.g., the Internet), Plain Old Telephone Service (POTS), or wireless (e.g., mobile, cellular, WiFi, WiMAX) networks.

It will be appreciated that one or more of the various example modules of the marketplace applications 126 may be combined into a single module. Further, in some embodiments, the one or more modules may be omitted and additional modules may also be included. Additionally, while the modules of FIG. 2 are discussed in the plural sense, it is noted that a single version of the module may be utilized.

Figure 3:
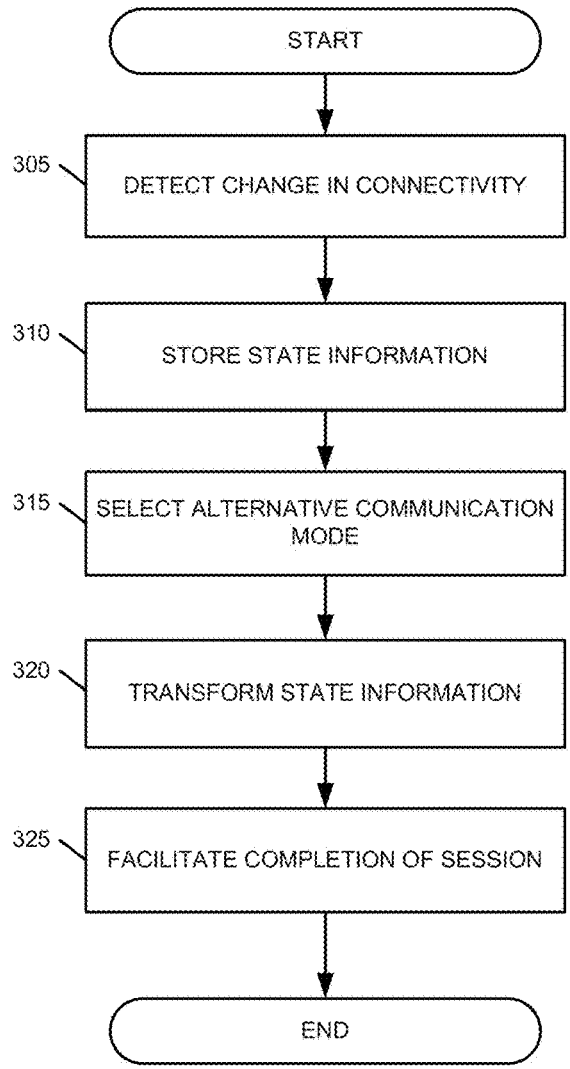
FIG. 3 is a flowchart illustrating an example method of facilitating completion of an interrupted electronic commerce session, according to an example embodiment.

FIG. 3 is a flowchart illustrating an example method 300 of facilitating completion of an interrupted electronic commerce session, according to an example embodiment. In this example, the method 300 may include operations such as detecting a change in connectivity 305, storing state information 310, selecting an alternate communication mode 315, transforming state information 320, and facilitating the completion of session 325.

At operation 305, a change in connectivity occurring during a user's electronic commerce session on a client device may be detected. The change in connectivity may introduce a delay in the commerce session. In some embodiments, the change in connectivity may interrupt the user in completing the commerce session with the client device 106. In some embodiments, the change in connectivity may be a poor connectivity event related to the connection 118 of the client device 106 with the communication network 104. For example, the user of client device 106 may experience a loss of cellular data transfer service during the payment of an item.

In some embodiments, the detecting of the change in connectivity may comprise measuring the latency of the connection 118 and determining that the latency is above a certain threshold. This threshold may be predefined by a system administrator.

At operation 310, the state of the electronic commerce session immediately prior to the detection of the change in connectivity may be stored in database 132. Furthering the example from above, the information stored in database 132 at operation 310 may reference the state of the commerce session as being the checkout of an item, and may include information related to the item, shipping destination information, and billing information. It should be noted that in some embodiments this state information is stored prior to the interruption being detected, in that in such embodiments the current state information may simply always be stored in case interruption occurs.

At operation 315, an alternate communication mode may be selected to continue the commerce session in response to the detection of the change in connectivity at operation 305. In some embodiments, the selection of the alternate communication mode may be based on user preferences. Continuing the example from above, the user may have specified a preference for receiving IM messages in the event of an interruption to an electronic commerce session. According to this embodiment, IM may be selected as the alternate communication mode.

In other embodiments, the selection of the alternate communication mode may be based on the capabilities of the client device 106 or on limitations placed on the capabilities of the client device 106 based on the physical location of the user.

At operation 320, the information related to the state of the electronic commerce session may be retrieved from database 132 and transformed. The information related to the state of the electronic commerce session may be transformed into a format compatible with the alternate communication mode selected at operation 315. The transformation of the state information may include removing certain pieces of information that are not essential to completing the electronic commerce session. For example, certain graphics or images included in an item description or item listing may be reduced in quality or completely removed if the selected alternate communication mode is SMS. Other pieces of non-essential textual information may also be removed from the state information.

In some embodiments, the transformed state information may be used to generate a message that is to be communicated to the user to facilitate completing the electronic commerce session. Consistent with this embodiment, the generation of such a message may include retrieving information associated with the user stored in a user profile at database 132. The retrieved user information may be included in the generated message and may be communicated to the user. For example, the user may have stored a default payment method in his corresponding user profile, which may include a billing address, a credit card number, an expiration date, and a security code. Such information may be used to generate a message to the user to confirm payment and complete the electronic commerce session.

At operation 325, the marketplace and payment applications 126 and 128 may facilitate the completion of the electronic commerce session. In some embodiments, the facilitating of the completion of the commerce session includes communicating the message to the user generated at operation 320 and including the transformed state information. In some embodiments, the message may be an automated voice message. In other embodiments, the message is a textual message communicated to the user through a text-based messaging system. Following the example from above, the user may be sent a brief IM message or set of IM messages confirming that the user intends to purchase the item, and the messages may further facilitate the payment of the item that had been previously interrupted. In some embodiments an option is presented to the user to transfer to a simpler communication means. The option may be presented as a banner, an overlay on top of the user interface, or other means of display and selection. In one embodiment, the selection is a switch positioned on the side of the user device.

The decision to transition to a different communication means may be a function of the type of information being exchanged or the stage of the transaction. For example, the transition decision may be made when the user is in check out and sending payment information, which is sensitive information and therefore there is a desire to protect this information. In contrast, if the user is searching but has not selected any product for purchase, the transition decision may decide not to transfer but remain in the current communication mode as no sensitive information is being processed.

In some embodiments, facilitating the completion of the transaction includes providing data to the client device 106 to display a reduced functionality online marketplace web-site. The reduced functionality online marketplace may include at least some of the features described herein with reference to the network system 100. The functionality is reduced in the sense that some of the interactivity and navigational features previously available to the user may be reduced or unavailable. Also, the images provided by reduced functionality online marketplace may be of a lower quality (e.g., lower resolution) or, in some embodiments, images may be completely omitted for the reduced functionality online marketplace.

Figure 4:
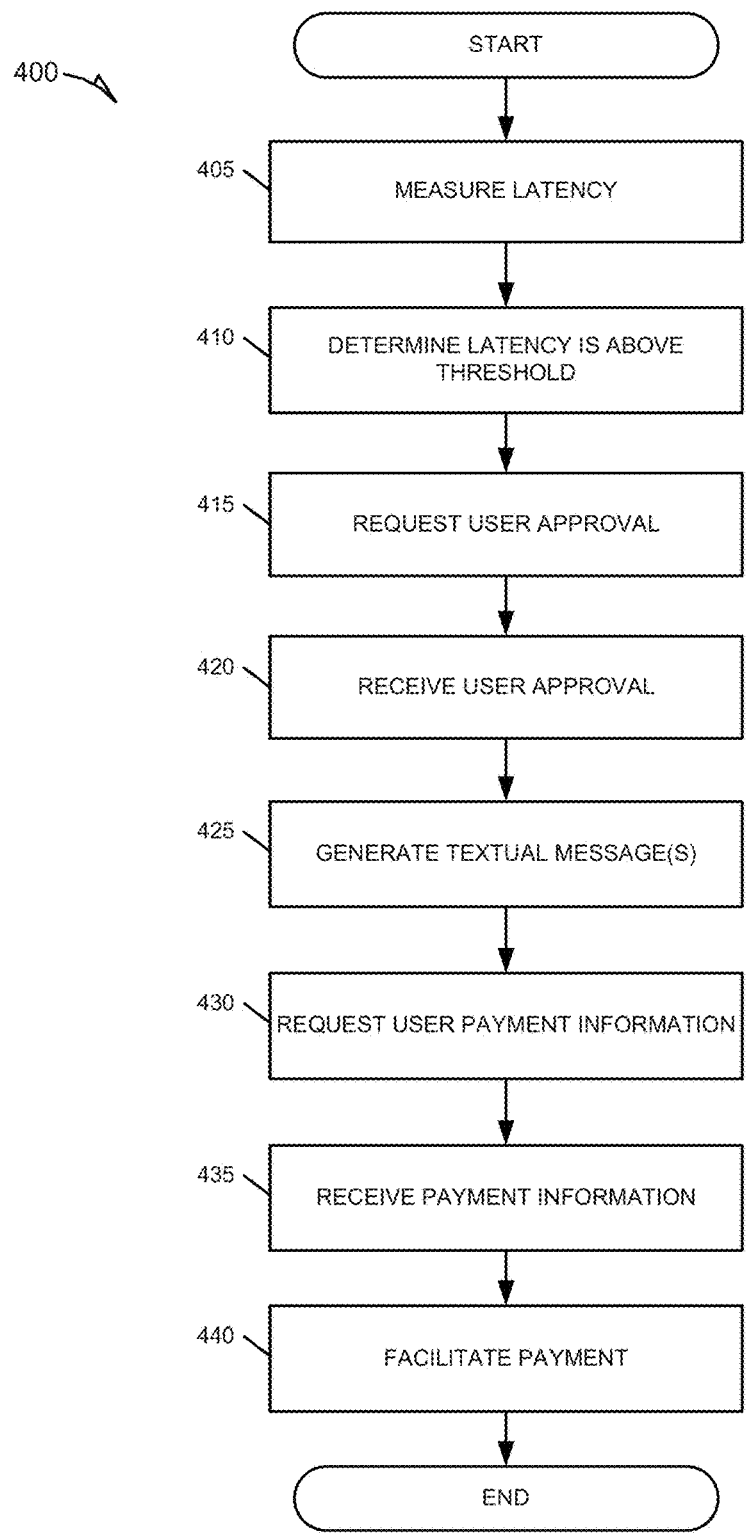
FIG. 4 is a flowchart illustrating an example method of facilitating completion of an interrupted electronic commerce session, according to an alternative embodiment, having a default alternate communication mode.

FIG. 4 is a flowchart illustrating an example method 400 of facilitating completion of an interrupted electronic commerce session, according to an alternative embodiment, having a default alternate communication mode. In this example, the operation 400 may include operations such as measuring latency of the connection 405, determining latency is above a threshold 410, requesting user approval 415, receiving user approval 420, generating textual messages 425, request payment information 430, receive payment information 435, facilitating payment 440.

At operation 405, the latency of the connection 118 of the client device 106 is measured. In some embodiments, the measuring of the latency of the connection includes measuring the time it takes a data packet to be transmitted from the client device 106 to the web server 122. In other embodiments, the measuring of the latency of the connection includes measuring the time it takes a packet of data to be transmitted from the client device 106 to a web server 122 and back to the client device 106.

At operation 410, the latency of the connection may be determined to be above a predefined threshold. The predefined threshold may indicate a specified period of time in which data must be able to be transferred between devices in order for a secure electronic commerce session to occur successfully. In some embodiments, the predefined latency threshold may be set by a network administrator.

Once the latency is determined to be above the predefined threshold, the state of the commerce session may be stored in database 132. In this example embodiment, the state of the electronic commerce session is a checkout state including the attempted payment of a group of items.

In response to determining that the latency of the connection is above the predefined threshold, at operation 415 a request may be communicated to the client device 106 for the user's approval in completing the commerce session via the default alternate communication mode. In this example embodiment, a text-based messaging system is the default alternate communication mode.

Upon receipt of user approval at operation 420, one or more textual messages may be generated at operation 425 to facilitate completion of the commerce session via a text-based messaging system. The generating of the one or more textual messages may also include retrieving user profile information stored in database 132. In this example embodiment, the generated text messages may include a request for payment information for the group of items that the user has attempted to purchase prior to the interruption.

At operation 430, the generated payment information request is communicated to the client device 106 using the text-based messaging system. The payment information request may include fields such as a billing address, an account or card number, an expiration date, and/or a security code. One or more of these fields may be pre-filled using information retrieved from the user's profile stored in database 132.

Upon receipt of the payment information from the client device at operation 435, the network system 100 facilitates the payment of the item at operation 440, thus completing the electronic commerce session. The facilitating of the payment may comprise invoking the functions of one or more payment applications 128. In particular, at operation 440, the network system 100 enables the transfer of values (e.g., funds, reward points, etc.) from an account associated with the user of the client device 106 to the account of the merchant offering the group of items for sale.

Figure 5:
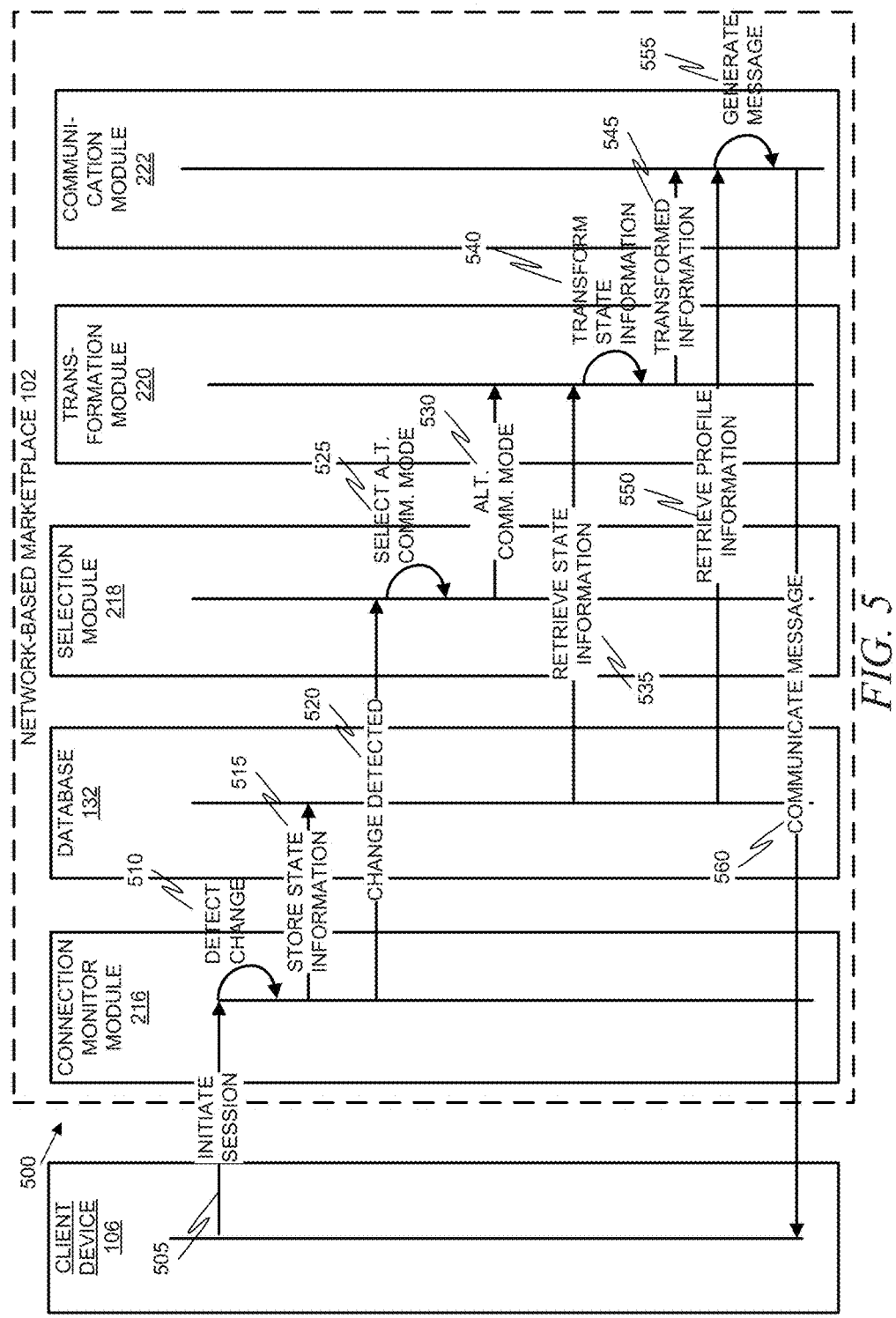
FIG. 5 is an interaction diagram illustrating an example method of facilitating completion of an interrupted electronic commerce session, according to an example embodiment

FIG. 5 is an interaction diagram illustrating an example method 500 of facilitating completion of an interrupted electronic commerce session, according to an example embodiment. In particular, FIG. 5 illustrates interactions between various components of the network-based marketplace 102, according to an example embodiment. Specifically, FIG. 5 illustrates interactions of the client device 106, database 132, and select marketplace applications 126 hosted by application server 124.

At operation 505, the client device 106 initiates an electronic commerce session with the network-based marketplace 102. The electronic commerce session may comprise a plurality of states including general navigation of the network-based marketplace 102, searching for products offered for sale, viewing item listings offered by online merchants, adding items to an electronic shopping cart, and purchasing items added to the electronic shopping cart. Upon initiation of the electronic commerce session, the connection monitor module 216 may begin monitoring the connection 118 of the client device 106 to the communication network 104.

At operation 510, the connection monitor module 216 may detect a change in connectivity which may cause a delay to the electronic commerce session. Upon detection of the change in connectivity, the connection monitor module 216 may cause information related to the state of the commerce session immediately prior to the detection of the change in connectivity to be stored in database 132 at operation 515.

At operation 520, the connection monitor module 216 may communicate information to the selection module 218 to cause the selection module 218 to select an alternate communication mode at operation 525. The alternate communication mode may be an alternative communication channel or network to continue or complete the electronic commerce session. The selection module 218 may subsequently pass information related to the selected alternate communication mode to the transformation module 220 at operation 530.

At operation 535, the transformation module 220 may retrieve the state information stored in database 132 at operation 515. At operation 540, the transformation module 220 may then transform the state information into a format that is suitable for the alternate communication mode selected by the selection module 218. In some embodiments, operation 540 may include reducing the amount of information in the stored information, thus decreasing the amount of bandwidth necessary to continue the commerce session. This may include reducing the quality of or completing removing any images in the stored state information. In some embodiments, operation 540 may include reducing the stored state information to a text-based format including only information that is essential to completing the commerce session.

The transformation module 220 may pass the transformed state information to the communication module 222 at operation 545. At operation 550, the communication module 222 may retrieve profile information for the user of client device 106 stored in database 132. The retrieved profile information may, for example, include a telephone number, an email address, a billing address, a shipping address, an account or credit card number, a credit card expiration date, and a security code.

At operation 555, the communication module 222 may generate one or more messages that are compatible with the alternate communication mode. The generated message or messages may facilitate the completion of the electronic commerce session. The communication module 222 may include the transformed state information received from the transformation module 220. In some embodiments, the generated message may include the user profile information retrieved at operation 550.

In some embodiments, the one or more generated messages may be an audio or voice recording. In other embodiments, the one or more generated messages may be a text based message. In other embodiments, the one or more generated messages may be a reduced functionality marketplace application.

At operation 560, the one or more generated messages may be communicated to the user via the alternate communication mode. Depending on the selected alternate communication mode, the communicating of the one or more messages may include retrieving a phone number or email address to which the one or more messages is to be transmitted.

Example User Interface

Figure 6A:
FIG. 6A is an interface diagram illustrating an example electronic commerce session, according to an example embodiment.

FIG. 6A is an interface diagram illustrating an example electronic commerce session 600, according to an example embodiment. As illustrated in FIG. 6A, the commerce session 600 may presented to a user on the display of a client device (e.g., client device 106). The electronic commerce session 600 may include viewing a product description page corresponding to item 602. Button 604 may enable the user of the client device to purchase the item 602 by initiating a checkout process for the item 602.

Upon selection of button 604, the client device may experience a loss of signal or a drop in data transfer service, thus resulting in the detection of a change in connectivity by the connection monitor module 216. The change in connectivity may introduce a delay and may disrupt the user in completing the electronic commerce session, which in this example includes completing payment for item 602. In response to detecting a change in connectivity, the selection module 218 may select an alternate communication mode to continue the electronic commerce session. In some embodiments, once an alternate communication mode has been selected, the communication module 222 may communicate a message to the client device 106 requesting the approval of the user in completing the electronic commerce session 600 using the alternate communication mode.

Figure 6B:
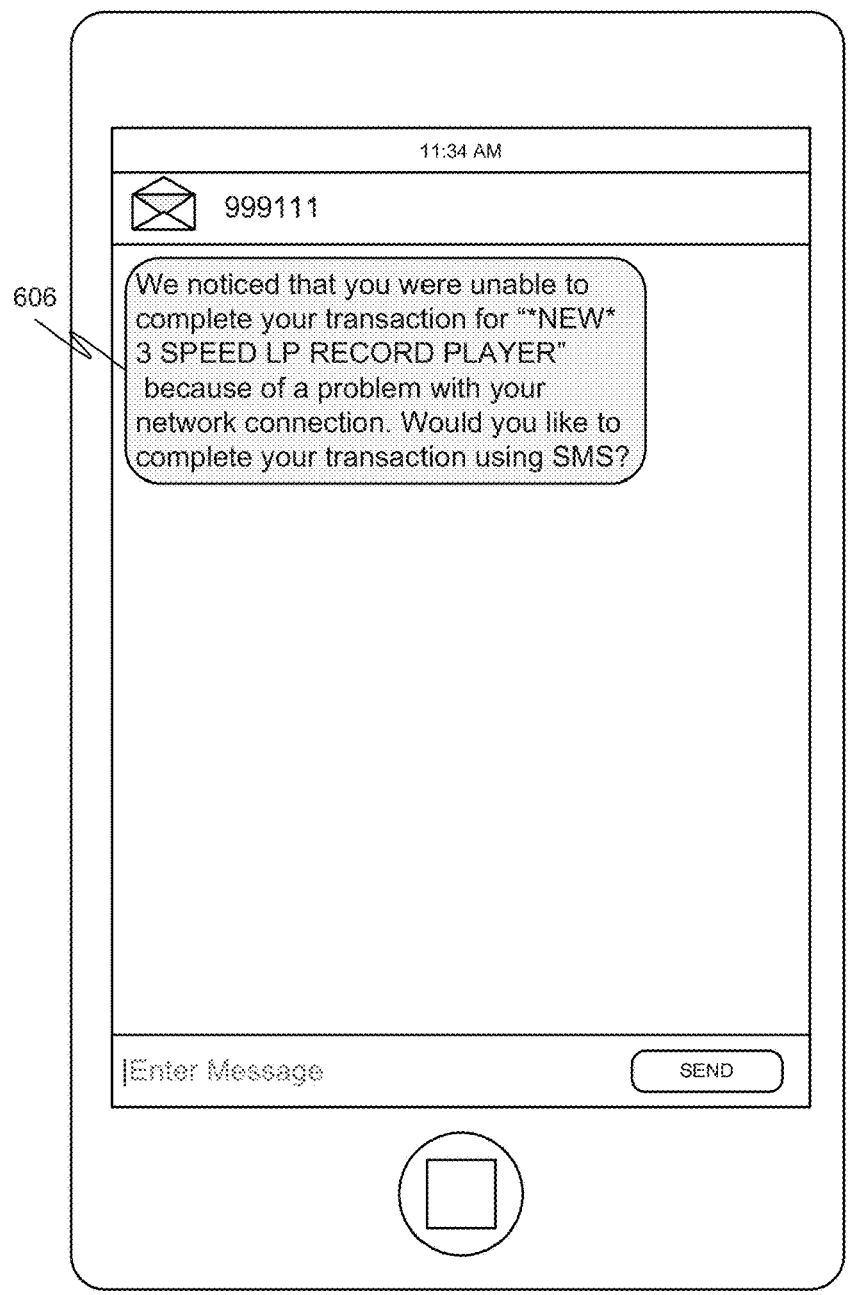
FIG. 6B is an interface diagram illustrating an example message communicated to the user in response to detecting a change in connectivity, according to an example embodiment.

FIG. 6B is an interface diagram illustrating an example message communicated to the user, according to an example embodiment. As illustrated in FIG. 6A, the message 606 may be communicated to the user subsequent to an interruption in the electronic commerce session 600. The message 606 may include a request for the user of the device to approve the use of the alternate communication mode selected by the selection module 218. As illustrated by the example embodiment in FIG. 6B, the alternate communication mode selected by the selection module 218 is a text-based messaging system. Specifically, in this example, the text-based messaging system is SMS. The message 606 may be communicated to the user using the alternate communication mode (e.g. SMS).

As illustrated in FIG. 6B, the request for approval by the user to continue the electronic commerce session using the alternative communication may necessitate a response by the user of client device 106. Upon receipt of a subsequent message by communication module 222 from the user approving completing via SMS, the communication module 222 may send further messages to facilitate the completion of the commerce session, which in this example includes facilitating a payment for an item.

Figure 6C:
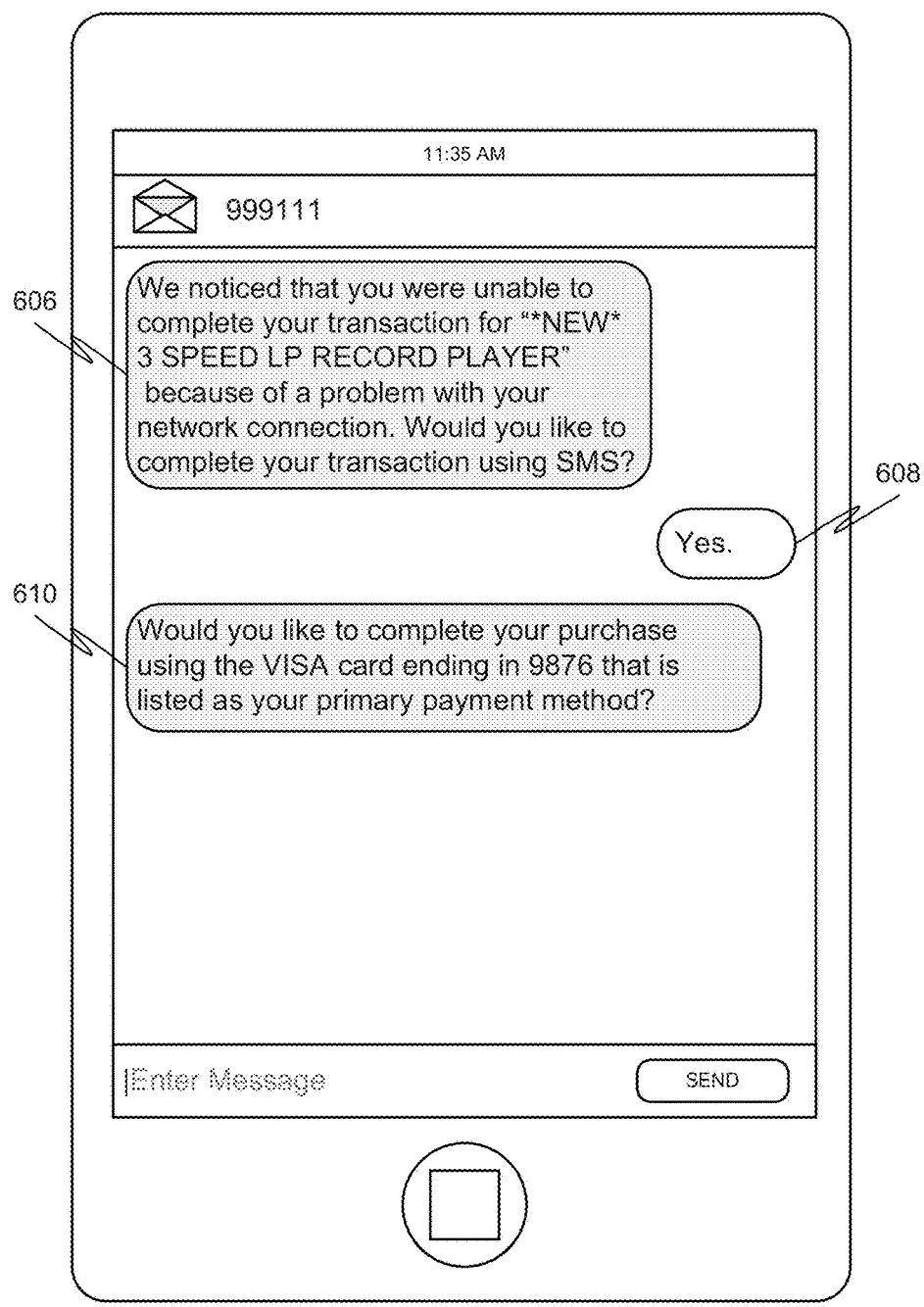
FIG. 6C is an interface diagram illustrating an example message communicated to the user, according to an example embodiment.

FIG. 6C is an interface diagram illustrating an example message communicated to the user, according to an example embodiment. As illustrated in FIG. 6C, the message 610 may be communicated to a user in response to receiving message 608, which indicates the approval of the user of the client device 106. The message 610 may include information (e.g., billing information) retrieved from the user profile stored in database 132. Upon receiving a message from the user confirming the information in message 610, the networked-based marketplace 102 may facilitate the completion of the commerce session 600, which, in this example, includes completing payment for the item 602.

Figure 6D:
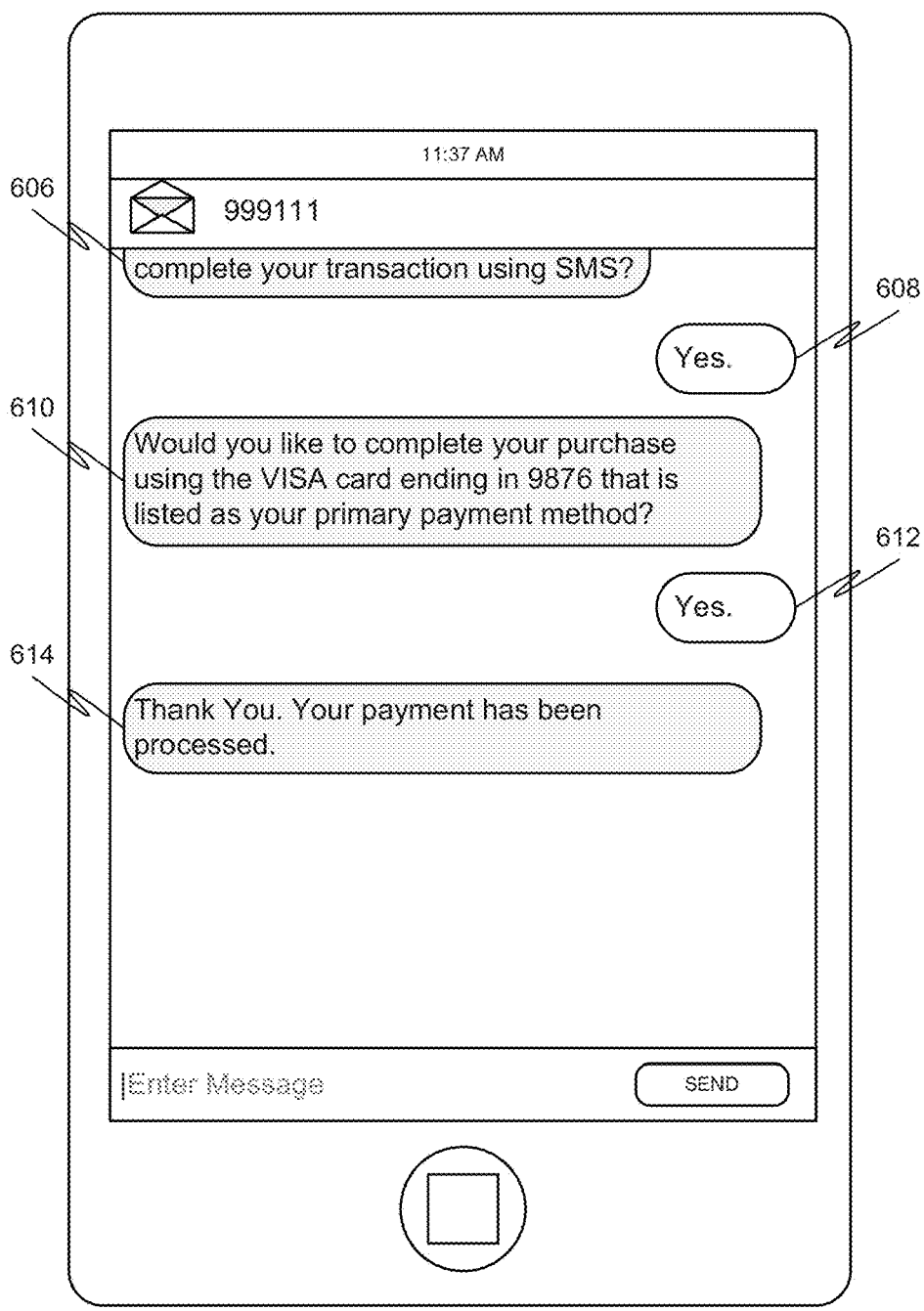
FIG. 6D is an interface diagram illustrating an example message communicated to the user, according to an example embodiment.

FIG. 6D is an interface diagram illustrating an example message communicated to the user, according to an example embodiment. Message 614 may be communicated to the user in response to receiving a confirmation 612 of the billing information included in message 610. The message 614 may confirm that the payment for item 602 is complete, and may thus confirm the completion of the electronic commerce session 600.

Example Client Device

Figure 7:
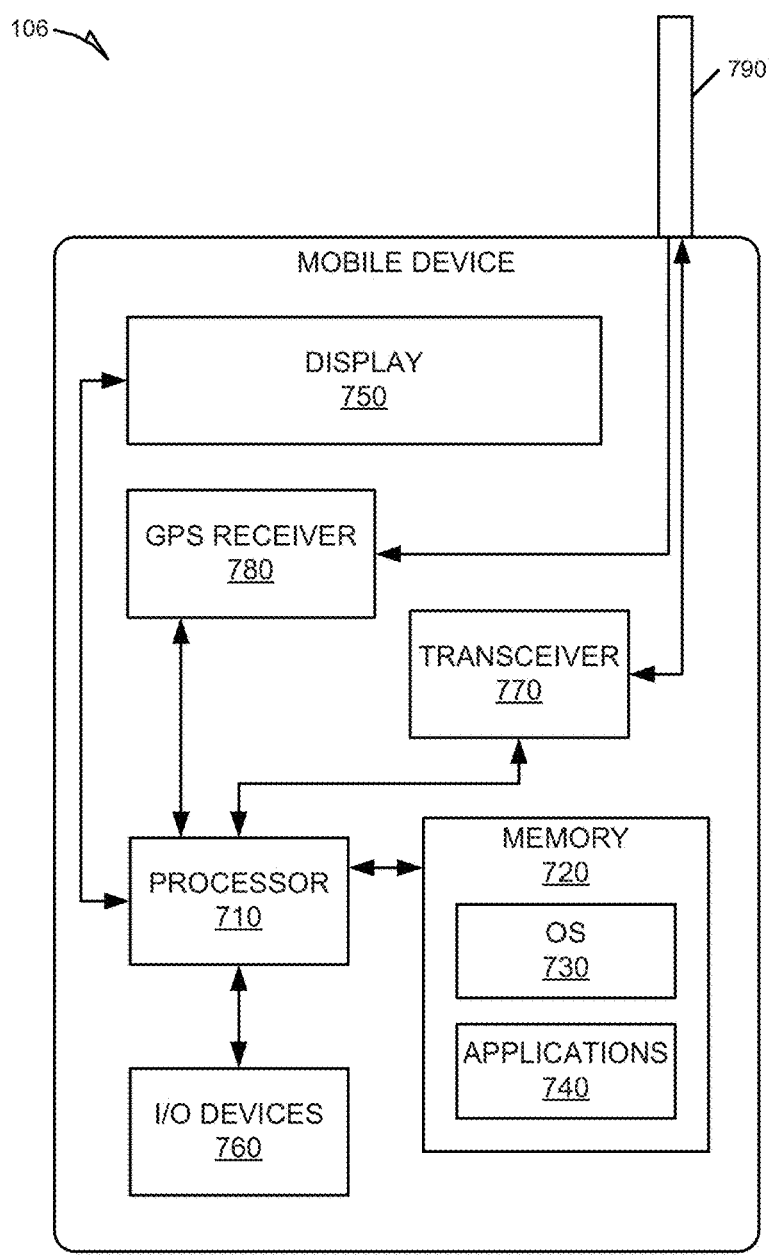
FIG. 7 is a block diagram illustrating a mobile device, according to an example embodiment.

FIG. 7 is a block diagram illustrating a client device 106, such as a mobile device, according to an example embodiment. The client device 106 may include a processor 710. The processor 710 may be any of a variety of different types of commercially available processors suitable for mobile devices (e.g., an XScale architecture microprocessor, a Microprocessor without Interlocked Pipeline Stages (MIPS) architecture processor, or another type of processor). A memory 720, such as a Random Access Memory (RAM), a Flash memory, or other type of memory, is typically accessible to the processor 710. The memory 720 may be adapted to store an operating system (OS) 730, as well as application programs 740, such as a mobile location enabled application that may provide location based services (e.g., physical location check-in) to a user. The processor 710 may be coupled, either directly or via appropriate intermediary hardware, to a display 750 and to one or more input/output (I/O) devices 760, such as a keypad, a touch panel sensor, a microphone, and the like. Similarly, in some embodiments, the processor 710 may be coupled to a transceiver 770 that interfaces with an antenna 790. The transceiver 770 may be configured to both transmit and receive cellular network signals, wireless data signals, or other types of signals via the antenna 790, depending on the nature of the client device 106. In this manner, the connection 118 with the network 104 may be established. Further, in some configurations, a GPS receiver 780 may also make use of the antenna 790 to receive GPS signals While various commerce examples are provided herein, the ability of a user device to transition to a different communication mode as a function of various communication and connectivity criteria may apply to other activities as well. For example, where the user is performing text based activities, such as email or using a textual app, such transition may be advantageous. Where the user is running a web-based email service or an email application on a mobile device, the connectivity may become poor increasing the latency and resulting in glitches in operation of the email application. The user device may then transition to a different communication mode such as to allow completion of the email operation in a texting mode. The transition may be from an information rich communication mode, such as web-based applications, to a less rich communication mode, such as a mobile app. Where the user device has not installed the corresponding mobile app, the transition to a text or other simple communication mode may include a message to download the corresponding app when connectivity improves.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a FPGA or an ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 8:
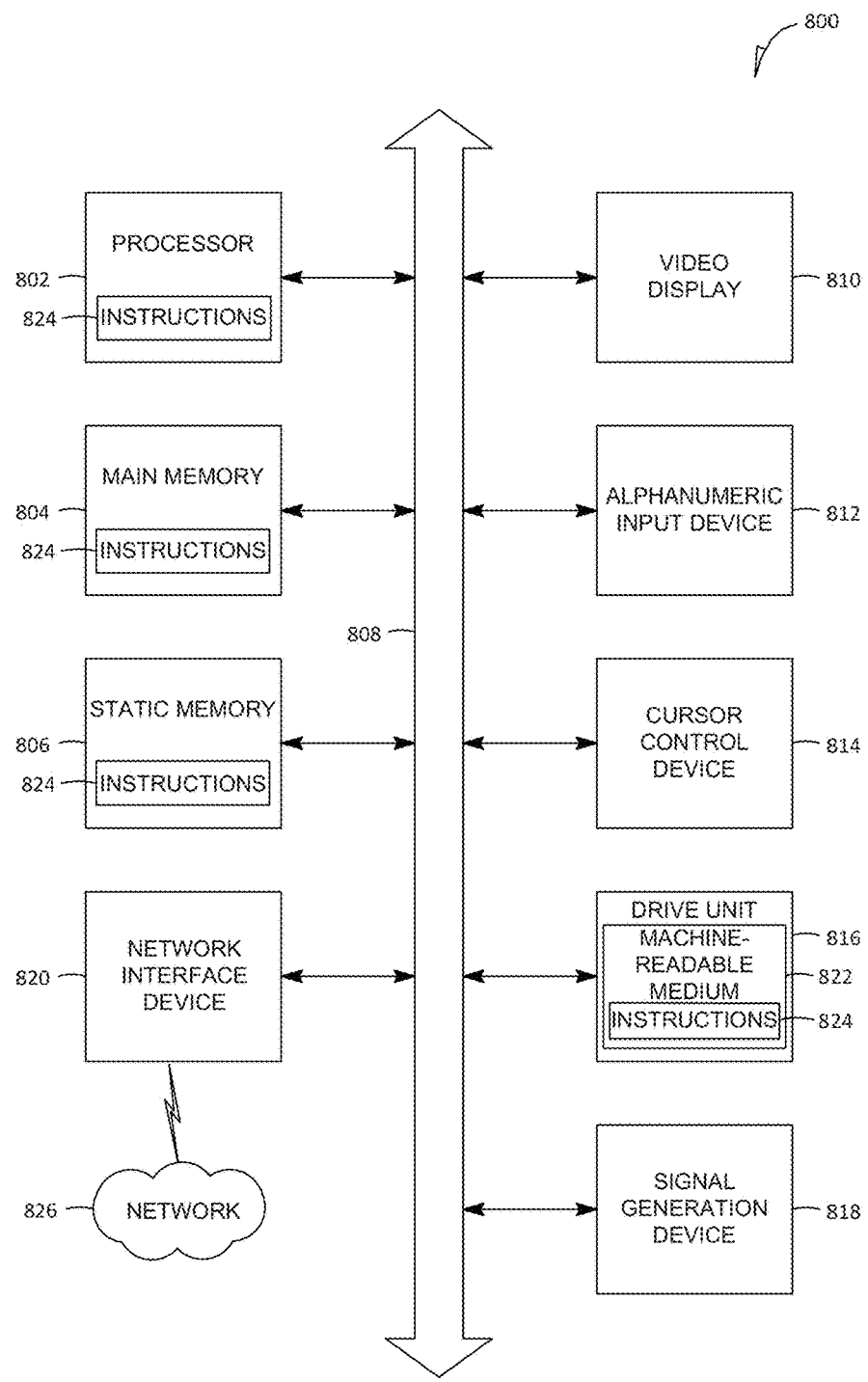
FIG. 8 is a diagrammatic representation of a machine in the example form of a computer system within which a set of instructions for causing the machine to perform any one or more of the methodologies discussed herein may be executed.

FIG. 8 is a block diagram of machine in the example form of a computer system 800 within which instructions 824 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a UI cursor control device 814 (e.g., a mouse), a disk drive unit 816, a signal generation device 818 (e.g., a speaker), and a network interface device 820.

Machine-Readable Medium

The disk drive unit 816 includes a machine-readable medium 822 on which is stored one or more sets of data structures and instructions 824 (e.g., software) embodying or used by any one or more of the methodologies or functions described herein. The instructions 824 may also reside, completely or at least partially, within the main memory 804, static memory 806, and/or within the processor 802 during execution thereof by the computer system 800, with the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more data structures or instructions 824. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

Although the embodiments of the present invention have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed:

1. A system comprising:
   a non-transitory memory storing instructions; and
   one or more processors configured to execute the instructions to cause the system to perform operations comprising:
   transmitting, from a server of a data-exchange platform over a network, instructions to cause a client device to generate, with respect to an electronic communication session between the server and the client device, a user interface to display a group of one or more interactivity features;
   measuring, by the data-exchange platform, a latency of a connection between the server and the client device with respect to the electronic communication session, the measuring of the latency including measuring an amount of time until a packet of data communicated from the server is received by the client device;
   determining, by the data-exchange platform, that the latency of the connection exceeds a predetermined threshold;
   detecting, by the data-exchange platform in response to determining that the latency exceeds the predetermined threshold, a poor connectivity event during the electronic communication session, the poor connectivity event introducing a delay to the electronic communication session; and
   in response to the detecting of the poor connectivity event:
   selecting, by the data-exchange platform, an alternate communication mode to continue the electronic communication session;
   identifying, by the data-exchange platform from a network database, a state of the electronic communication session that occurred prior to the detecting of the poor connectivity event and information related to the state of the electronic communication session;
   modifying, by the data-exchange platform, the information into a format compatible with the alternate communication mode such that the information is able to be communicated via the alternate communication mode, the modifying of the information including causing a particular interactivity feature of the group of one or more interactivity features to become inactive based on the particular interactivity feature being incompatible with the alternate communication mode; and
   communicating, by the data-exchange platform, the information as modified using the alternate communication mode to enable completion of the electronic communication session.

2. The system of claim 1, wherein the electronic communication session includes a transaction for at least one item or service.

3. The system of claim 2, wherein the user interface is configured to facilitate payment of the at least one item or service.

4. The system of claim 1, wherein the poor connectivity event is reduced bandwidth of the connection between the client device and the server.

5. The system of claim 1, wherein the poor connectivity event is an increase to a load on the server exceeding a predefined threshold.

6. The system of claim 1, wherein the poor connectivity event is a malfunction of the client device.

7. The system of claim 1, wherein the alternate communication mode is selected from one of a text-based messaging system, cellular over air data communication, WiFi communication, or cellular over the air voice communication.

8. The system of claim 1, wherein the poor connectivity event is based on a change in geographical position of the client device.

9. A method comprising:
   transmitting, from a server of a data-exchange platform over a network, instructions to cause a client device to generate, with respect to an electronic communication session between the server and the client device, a user interface that is configured to display a group of one or more interactivity features;
   measuring, by the data-exchange platform, a load of the server during the electronic communication session, the measuring of the load including measuring an amount of computational work being performed by the server;
   determining, by the data-exchange platform, that the load of the server exceeds a predetermined threshold;
   detecting, by the data-exchange platform in response to determining that the load of the server exceeds the predetermined threshold, a poor connectivity event during the electronic communication session, the poor connectivity event introducing a delay to the electronic communication session; and in response to the detecting of the poor connectivity event:
  selecting, by the data-exchange platform, an alternate communication mode to continue the electronic communication session;
  identifying, by the data-exchange platform from a network database, a state of the electronic communication session that occurred prior to the detecting of the poor connectivity event and information related to the state of the electronic communication session;
  modifying, by the data-exchange platform, the information into a format compatible with the alternate communication mode such that the information is able to be communicated via the alternate communication mode; and
  communicating, by the data-exchange platform, the information as modified using the alternate communication mode to enable completion of the electronic communication session.

10. The method of claim 9, wherein the electronic communication session includes a transaction for at least one item or service and wherein the user interface is configured to facilitate payment of the at least one item or service.

11. The method of claim 9, wherein the detecting of the poor connectivity event further comprises:
  measuring a latency of a connection between the server and the client device with respect to the electronic communication session between the server and the client device, the measuring of the latency including measuring an amount of time until a packet of data communicated from the server is received by the client device;
  determining that the latency of the connection exceeds a predetermined threshold; and
  detecting the poor connectivity event in response to determining that the latency exceeds the predetermined threshold.

12. The method of claim 9, wherein the poor connectivity event is reduced bandwidth of the connection between the client device and the server.

13. The method of claim 9, wherein the poor connectivity event is related to a malfunction of the client device.

14. The method of claim 9, further comprising:
  communicating a request to the client device requesting approval to continue the electronic communication session using the alternate communication mode;
  receiving approval from client device to continue the electronic communication session through alternate communication mode; and
  in response to receiving the approval, communicating the information as modified using the alternate communication mode.

15. The method of claim 9, wherein the alternate communication mode is a text-based messaging system.

16. The method of claim 15, wherein the text-based messaging system is short message service (SMS).

17. The method of claim 9, wherein the selecting of the alternate communication mode is based on user preferences.

18. A non-transitory machine-readable storage medium having embodied thereon instructions executable by one or more processors to cause performance of operations comprising:
  transmitting, from a server of a data-exchange platform over a network, instructions to cause a client device to generate, with respect to an electronic communication session between the server and the client device, a user interface to display a group of one or more interactivity features;
  determining one or more measured factors by performing one or more factor measurement operations selected from a group of factor measurement operations consisting of:
    measuring, by the data-exchange platform, a load of the server during the electronic communication session, the measuring of the load including measuring an amount of computational work being performed by the server; and
    measuring, by the data-exchange platform, a latency of a connection between the server and the client device with respect to the electronic communication session, the measuring of the latency including measuring an amount of time until a packet of data communicated from the server is received by the client device;
  detecting, by the data-exchange platform, a poor connectivity event during the electronic communication session, the poor connectivity event introducing a delay to the electronic communication session and being determined based on the one or more measured factors; and
  in response to the detecting of the poor connectivity event:
    selecting, by the data-exchange platform, an alternate communication mode to continue the electronic communication session;
    identifying, by the data-exchange platform from a network database, a state of the electronic communication session that occurred prior to the detecting of the poor connectivity event and information related to the state of the electronic communication session;
    modifying, by the data-exchange platform, the information into a format compatible with the alternate communication mode such that the information is able to be communicated via the alternate communication mode; and
    communicating, by the data-exchange platform, the information as modified using the alternate communication mode to enable completion of the electronic communication session.

* * * * *